United States Patent
Aswadhati (10) Patent No.: US 9,250,687 B1
(45) Date of Patent: Feb. 2, 2016

(54) HIGH PERFORMANCE FLEXIBLE STORAGE SYSTEM ARCHITECTURE

(76) Inventor: Ajoy Aswadhati, Cupertino, CA (US)

(*) Notice: Subject to any disclaimer, the term of this patent is extended or adjusted under 35 U.S.C. 154(b) by 1458 days.

(21) Appl. No.: 12/806,358

(22) Filed: Aug. 10, 2010

Related U.S. Application Data (60) Provisional application No. 61/273,881, filed on Aug. 10, 2009.

(51) Int. Cl.
*G06F 15/167* (2006.01)
*G06F 1/32* (2006.01)

(52) U.S. Cl.
CPC .................................... *G06F 1/3225* (2013.01)

(58) Field of Classification Search
CPC .............. G06F 1/3225; G06F 12/0246; H04L 67/1008
USPC ........... 709/226, 212, 213; 370/389; 710/100
See application file for complete search history.

(56) References Cited

U.S. PATENT DOCUMENTS

| | | | |
|---|---|---|---|
| 2005/0025055 A1* | 2/2005 | Jain et al. ...................... | 370/235 |
| 2008/0071939 A1* | 3/2008 | Tanaka et al. .................. | 710/18 |
| 2009/0074001 A1* | 3/2009 | Kalkunte et al. .............. | 370/419 |
| 2009/0089546 A1* | 4/2009 | Lakshmanamurthy et al. ............................. | 712/203 |
| 2010/0325280 A1* | 12/2010 | Jindal et al. ................... | 709/226 |

* cited by examiner

*Primary Examiner* — Phuoc Nguyen (57) ABSTRACT

A modular data storage system uses CPU blades to communicate with remote clients to function as a file server to those clients. The files are store on solid-state data storage blades using, e.g., flash memory. A crossbar switch connects the CPU blades and the data storage blades. The system can provide access time, power consumption, reliability, maintainability, and other advantages over prior art file servers using disk shelves.

15 Claims, 6 Drawing Sheets

HIGH PERFORMANCE FLEXIBLE STORAGE SYSTEM ARCHITECTURE

BACKGROUND

1. Field of the Invention

The present disclosure relates generally to data storage systems, and more particularly to a solid state blade-based storage system and methods of use and operation.

2. Description of Related Art

Current generation data server architectures are optimized for data stored on rotating media such as hard disk drives. Hard disk drives have very high latency in the order of milliseconds, relatively slow read speeds, and a random IOPS (Input Outputs per second) on the order of few hundred IOPS. To achieve higher performance with such systems, a single file must be distributed over multiple hard disk drives using a complex controller, commonly known as a RAID (Redundant Array of Inexpensive Disks) controller. When a file or set of data needs to be assembled, the RAID controller determines the "striping" and/or "mirroring" pattern used to distribute the file, and issues multiple respective requests to multiple drives for the portions of the data held on those drives. The RAID controller then assembles the data supplied from the individual drives. Seek time latency is unchanged by RAID— thus such a system may have random IOPS performance, for small unfragmented files, not much better than a single drive. The use of multiple high-speed disks also decreases the mean time between disk failures for a single distributed file; additional disks must be included to provide fault tolerance. The RAID system is also quite energy inefficient—significant computational demands are placed on the controller and the hard drives must rotate at high speed to boost performance.

Figure 1:
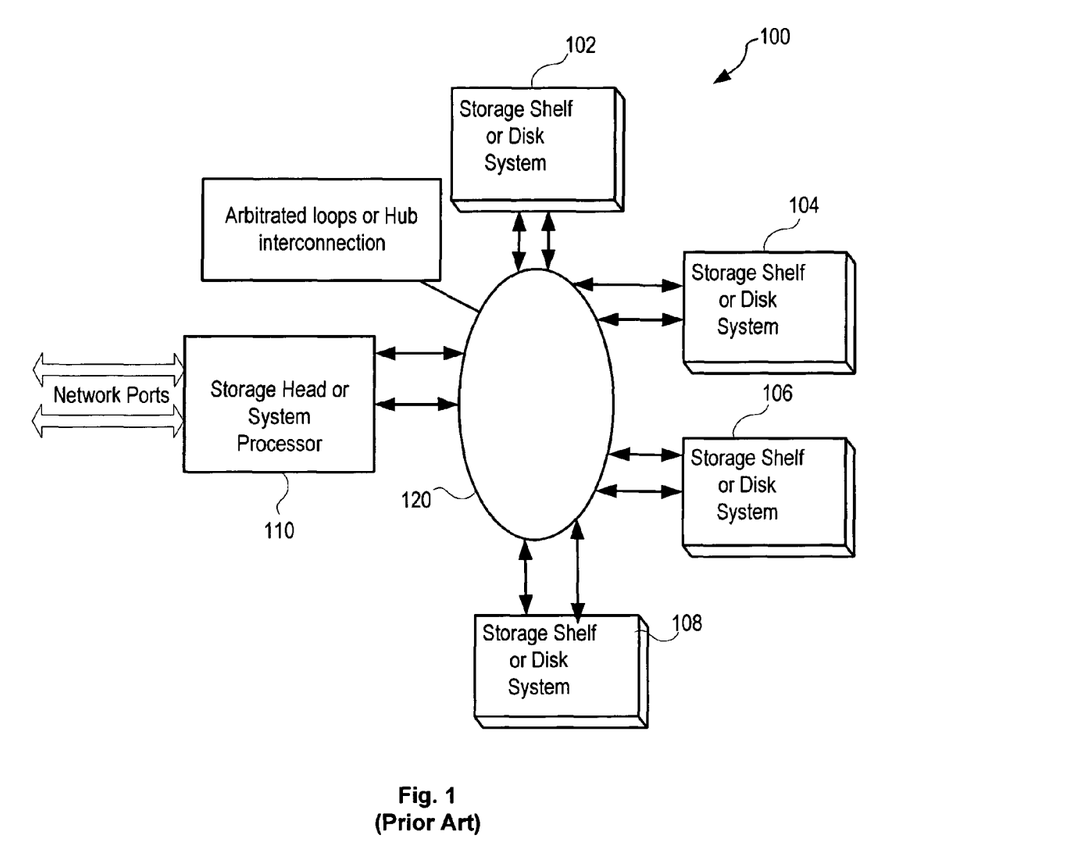
FIG. 1 illustrates a prior art distributed storage system.

FIG. 1 illustrates a block diagram for a traditional large storage system. Storage shelves 102, 104, 106, 108 are rack-mounted units. Each storage shelf may consist of a JBOD (Just a Bunch Of Disks), or may house multiple disk drives and possibly a RAID controller, appearing as a different disk configuration than its actual physical configuration. A storage head 110, also a rack-mounted unit, interfaces between a network and the storage shelves, and may include a RAID controller or simple single mapping of data to disks. On the network side, network ports connect storage head 110 to networked clients (not shown) over a network (e.g., Ethernet, Fiber Channel). Storage head 110 and the clients cooperate using a standard protocol, such as a NAS (Network-Attached Storage) protocol for file-based access or a SAN (Storage-Area Network) protocol for block-based access. A complicated interconnection 120, involving cables and/or optic fibers, and a dedicated ring or hub network, connects the shelves, which are distributed in one or more racks. The cables and attendant transponders between the shelves provide additional common points of failure, incorrect provisioning, or inadvertent disconnection.

BRIEF DESCRIPTION OF THE DRAWINGS

The present invention can be best understood by reading the specification with reference to the following Figures, in which.

DETAILED DESCRIPTION

The embodiments presented herein illustrate a novel flash-based storage system. The storage system, in one group of embodiments, operates within a single enclosure that provides redundant connections, redundant processors, redundant cooling, and redundant power. As compared to a traditional hard-drive based storage system of similar storage capacity, the flash-based storage system typically provides decreased latency, increased IOPS, decreased power and cooling requirements, decreased size, and higher reliability. The ability to achieve such advantages in a given design will become apparent in the detailed description below.

Figure 2:
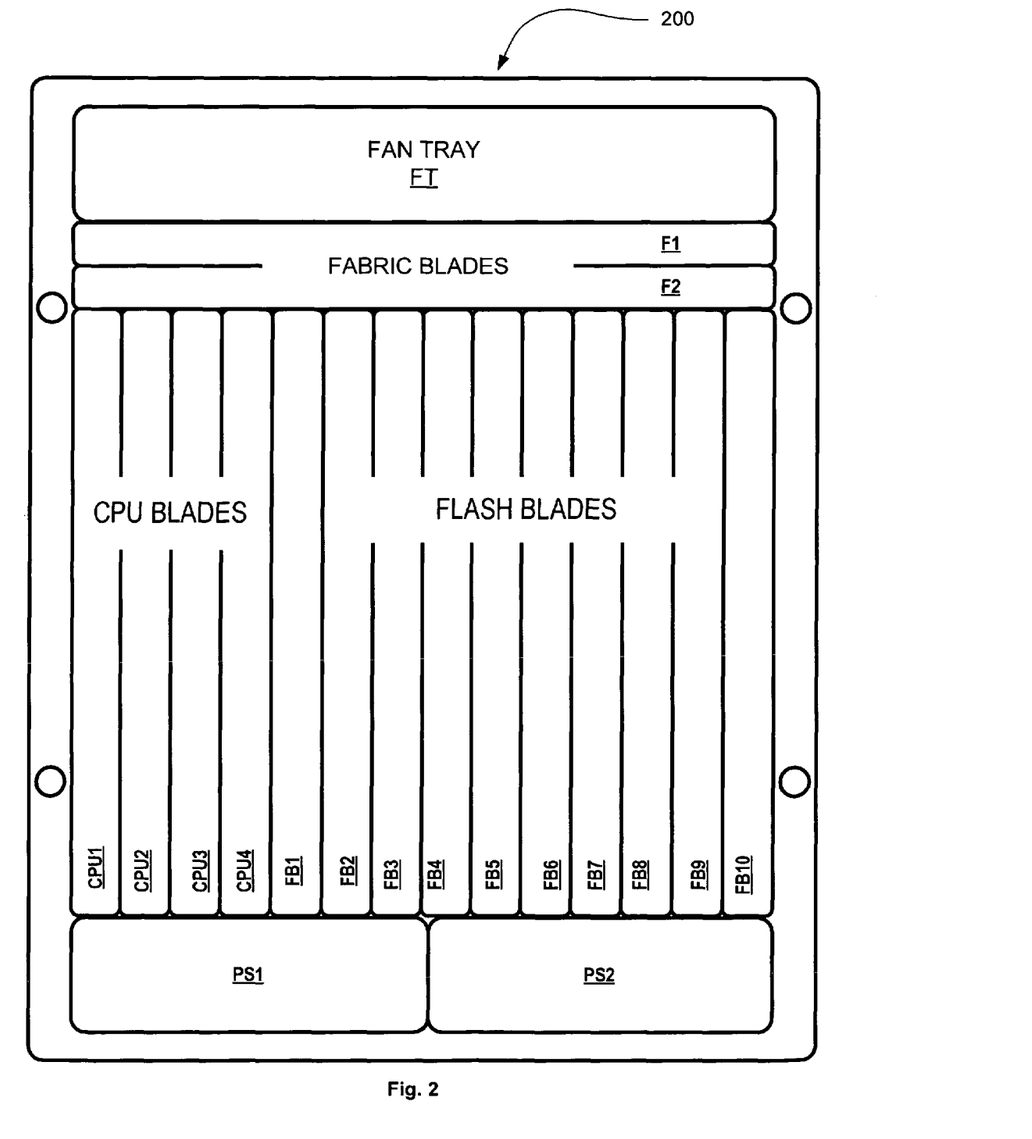
FIG. 2 shows in front view the physical arrangement of a storage system according to an embodiment.

FIG. 2 shows a front view of an exemplary storage system 200. A chassis 210 houses redundant power supplies PS1, PS2, CPU (Central Processing Unit) blades CPU1 to CPU4, flash blades FB1 to FB10, fabric blades F1, F2, and a fan tray FT. Not visible in FIG. 2 is a backplane within chassis 210, to which all the other chassis-mounted components connect.

Power supplies PS1, PS2 (more than two power supplies can be used in an N+1 redundant system) convert external power to a standard DC voltage used by the blades and fan tray. The standard DC voltage is supplied over one or more power distribution channels within the backplane and/or a bus bar system to the blade slots. In alternate embodiments, a battery can be used to augment the power supplies and provide some level of operation (orderly shutdown and flushing of write buffers on the flash blades, normal operation for some time period, extended-time low power operation using one CPU blade, etc.) for the chassis upon complete power failure.

Figure 3:
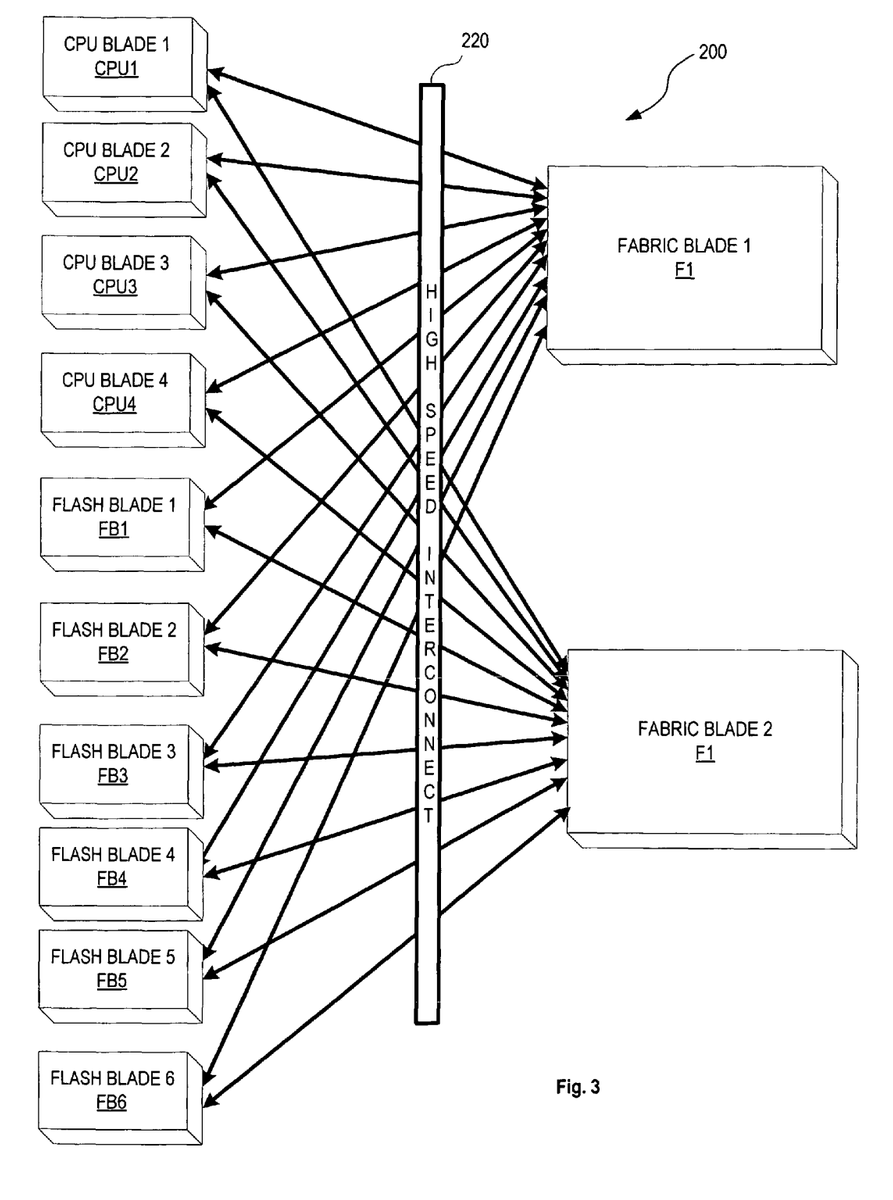
FIG. 3 contains a block diagram for a storage system according to an embodiment.

FIG. 3 shows, in block diagram form, the interconnections between the various blades of the system 200. Backplane 220 supports signaling between the blades. Each CPU blade and flash blade connects via a high-speed point-to-point interconnection across backplane 220 to each fabric blade, providing redundant connections between each pairing of CPU and flash blades. The interconnections can carry proprietary signaling or conform, e.g., to common standards such as Ethernet, Infiniband, and PCI-E (Peripheral Component Interconnect-Express). It is now believed that PCI-E provides a unique advantage in that protocol translation and/or encapsulation can be avoided, with CPU-to-CPU blade and CPU/flash blade communication occurring over a native bus format supported by standard CPU chipsets. The reduction or elimination of translation overhead allows for enhanced scalability with lower system complexity and transaction latency.

Figure 4:
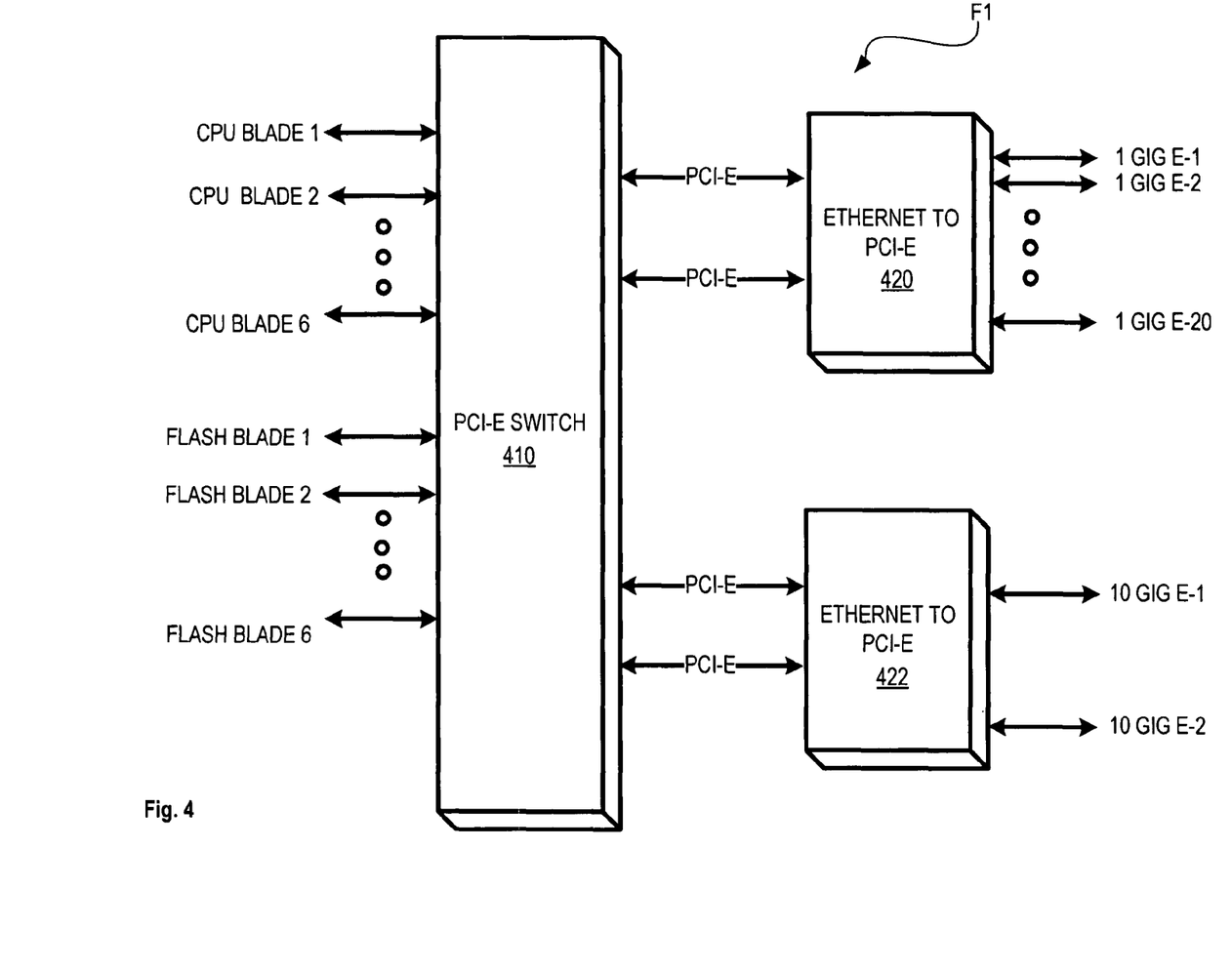
FIG. 4 contains a block diagram for a fabric blade useful in an embodiment.

FIG. 4 shows a block diagram for a fabric blade F1 according to a PCI-E embodiment. A PCI-E crossbar switch 410 passes PCI-E packets between PCI-E interconnects for each CPU blade, each flash blade, and two Ethernet to PCI-E adapters 420, 422. Each PCI interconnect comprises at least one PCI-E-conforming lane (each lane comprises a transmit differential pair and a receive differential pair). Higher throughputs are formed by increasing the lane width for an interconnect in powers of 2 (1, 2, 4, 8, 16, or 32 lanes). Although typically each CPU blade will have the same lane width as each other, as will each flash blade and each Ethernet to PCI-E connector, different lane widths can be supported for each blade type or adapter, depending on needs. In alternate embodiments, the PCI-E switch could be replaced with an Ethernet, Infiniband, or proprietary switch design.

In some embodiments, the storage system implements a single-root hierarchy, i.e., all CPU and flash blades share their assigned partitions of a shared memory space. Alternately, the PCI-E switches, host adapters, and/or flash blades can support multi-root input/output virtualization (MRIOV), wherein each CPU blade is assigned its own device address range and configuration register space on each flash blade. Non-Transparent Bridging (NTB), supported in at least some PCI-E switches, can be used for high-speed, low-latency CPU blade-to-CPU blade communication and/or CPU blade-to-flash blade communication. Each CPU blade can then utilize its full native addressing space, with the PCI-E switches and flash blades sorting out the physical resources allocated to serving each CPU blade.

The adapters 420, 422 support host ports for connecting the storage system directly to clients, application servers, or network switches/routers. Preferably, the network adapters are themselves modular. FIG. 4 shows adapter 420 supporting 20 1-Gigabit Ethernet host ports and adapter 422 supporting 2 10-Gigabit Ethernet host ports. Other adapter modules, such as Infiniband or Fiber Channel, can also be supported. In some embodiments, different adapter module types can be chosen to permit system support for a plurality of applications in either NAS or SAN formats.

Each CPU blade supports NAS and/or SAN protocol exchanges according to its configured formats. In various embodiments, different protocols can be assigned to different CPU blades, or different host ports can be assigned to different CPU blades. A master CPU blade can configure the partitioning of tasks among the CPU blades, according to a stored configuration and/or a remote management interface. All new host connection requests, for example, can initially be routed to the master CPU blade, which will then route the connection to an appropriate CPU blade for service.

Figure 5:
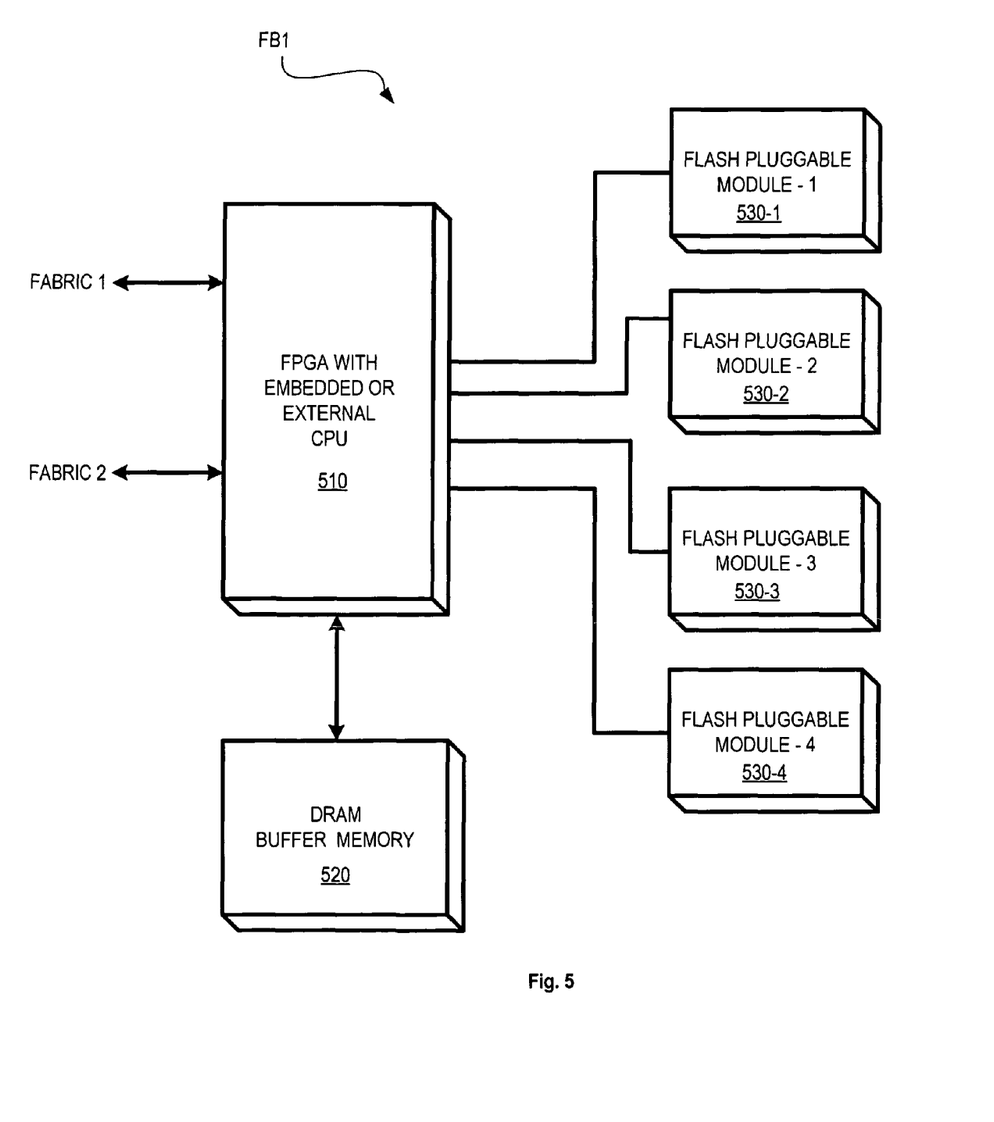
FIG. 5 contains a block diagram for a flash blade useful in an embodiment.

FIG. 5 contains a block diagram for one embodiment of flash blade FB1. Flash blade FB1 comprises a FPGA (Field-Programmable Gate Array) 510 that operates as a logic subsystem, a DRAM (Dynamic Random Access Memory) 520, and a plurality of flash memory pluggable modules 530-1 to 530-4. The logic subsystem can include or consist of, instead of or in addition to an FPGA, other logic elements such as a microprocessor or an ASIC (Application Specific Integrated Circuit).

FPGA 510 contains PCI-E transceivers and registers to support communications with each fabric blade, and memory bus transceivers to support device-level memory operations on each flash pluggable module. The FPGA can also include an embedded CPU or an interface to an external dedicated CPU subsystem for supporting firmware-implemented blade tasks.

In one embodiment, data and/or commands received from the CPU blades are queued by FPGA 510 in DRAM 520 for processing in the order received. Read commands are processed in the order received, and served by reading the requested blocks in one or more of the flash pluggable modules, and transferring the requested data over an appropriate fabric port to the requesting CPU blade. Depending on the relative performance of the DRAM 520 and the type of flash memory employed, FPGA 510 may implement a read cache using a portion of DRAM 520. For instance, in one mode a page is read from a flash pluggable module, even if less than a page is requested. The page is stored in a DRAM 520 cache, the portion of the page requested is supplied to the requestor, and a subsequent read request to the same page by a requestor will hit the cache (unless overwritten in the interim by a read or write operation into the same cache line) and be supplied from the cache.

Another potentially significant use of DRAM 520 is for write caching. The CPU blades can potentially supply write data to a flash blade more rapidly than the flash blade can write to flash. FPGA 510 caches the write data in DRAM 520 and writes the data when possible. By caching write data and intentionally delaying write to flash, FPGA 510 can also frequently combine multiple small writes into a larger write operation, thus preventing wearing out of the flash due to excessive writes.

FPGA 510 can track wear statistics for each block on each attached flash pluggable module. One or more of the CPU blades then gathers the wear statistics from the flash blades and periodically performs global wear leveling and/or bad block marking. For instance, data blocks and/or files containing data blocks stored in flash blocks experiencing significant wear can be swapped globally with data blocks and/or files that appear to be experiencing little or no wear. In the case where this can be done locally on a flash blade, the FPGA on the affected blade can be tasked to perform a local data move. In the case where data is transferred between flash blades, the CPU blade can perform the transfer. Alternately, the flash blade FPGAs can be equipped with the capability to perform a flash-blade-to-flash-blade data transfer upon command from a CPU blade.

Flash pluggable modules are preferably hot-swappable and hot-pluggable. The CPU blades can choose to take a worn out or defective flash pluggable module out of service. Maintenance personnel can then replace such modules with fresh modules, without bringing down the system or the affected flash blade. Status LEDs can be provided to indicate when it is safe to remove a module.

The flash blade logic subsystem can also be used to implement and accelerate CPU-intensive tasks such as ECC (Error Correction Code) generation and validation. The flash blade logic calculates ECC data for write data received from a CPU blade, and stores the ECC data in association with the write data. After the data is written, a verify operation checks that the data has been correctly written. When the data is subsequently read upon request from a CPU blade, the flash logic blade calculates checksums, performs error correction if needed and possible, and notifies the CPU blade when the data is corrupted and uncorrectable.

Figure 6:
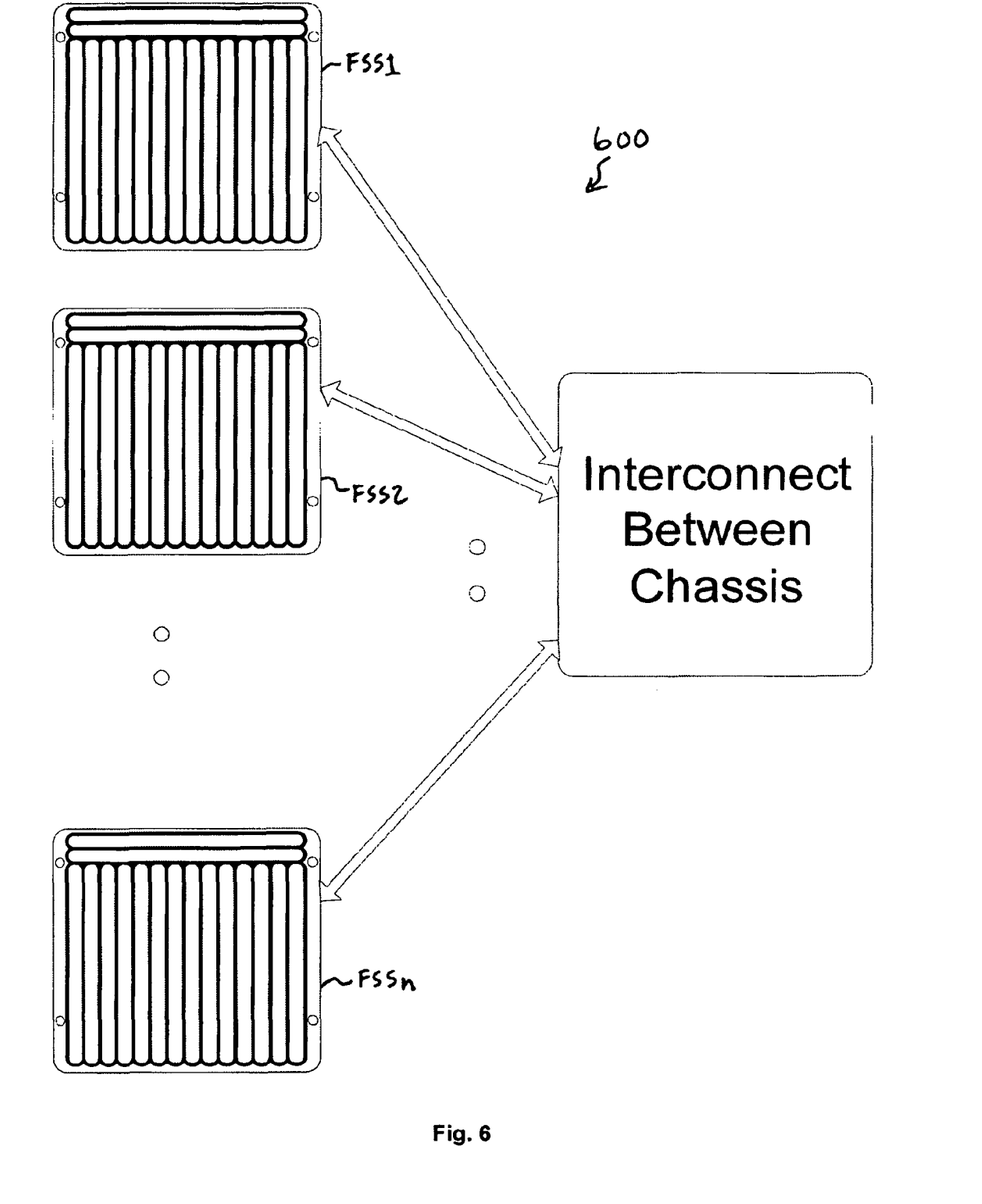
FIG. 6 shows a larger system embodiment formed by interconnecting multiple storage systems.

Should an even larger storage system be required than can be provided in one chassis, multiple system chassis can be connected in some embodiments. FIG. 6 illustrates one such embodiment, a multi-chassis storage system 600. Storage system 600 comprises n flash storage systems FSS1 to FSSn, connected via an interconnect 610. The interconnect can be, e.g., Ethernet, Infiniband, or PCI-E-based, as appropriate. For instance, in a PCI-E embodiment, each fabric blade can have one or more external stacking ports that connect to an otherwise unused port on the blade PCI-E switch. When connected to a stacking port on another fabric blade, the stacking ports allow sharing of flash blade resources across the chassis. Alternately, one of the host adapters in a fabric blade or CPU blade can accept an adapter containing a second PCI-E switch, allowing a high-speed connection at a higher bridge layer between the chassis.

Those skilled in the art will appreciate that the embodiments and/or various features of the embodiments can be combined in other ways than those described. The CPU blade and flash blade slots in a chassis may not be dedicated as such, with a plurality of slots designated that can receive either blade type. Such a system can be provisioned to provide an appropriate balance of CPU performance and storage capacity, depending on the application. Further, a third card type, or a direct connection from one of the other cards, can provide a port interface for external connection to a separate JBOD or RAID hard disk drive storage shelf. This card type provides a low-cost expansion capability for data backups, large but infrequently accessed data, etc. The CPU blades can even manage such a system such that little-accessed data migrates to the remote storage shelf and popular data migrates to the flash blades. Although specific embodiments described herein refer to "flash memory" as an exemplary type of solid state non-volatile memory, an embodiment can use, for instance, NAND flash memory, NOR flash memory, Phase Change memory, any other solid-state non-volatile memory devices, or mixed combinations thereof in different blades.

Although the specification may refer to "an", "one", "another", or "some" embodiment(s) in several locations, this does not necessarily mean that each such reference is to the same embodiment(s), or that the feature only applies to a single embodiment.

What is claimed is:

1. A data storage system comprising:
    a chassis having a plurality of component blade slots therein;
    a first Central Processing Unit (CPU) blade mounted in one of the plurality of component blade slots;
    a CPU blade running NAS for file-based access and or SAN storage protocol for block-based access;
    first and second solid-state non-volatile memory blades mounted in others of the plurality of component blade slots;
    CPU blade performing global wear leveling and or bad block marking, within the flash blades and across flash blades which leads to increased endurance of the flash array;
    DRAM to combine multiple small writes into a larger write operation, to prevent wear out of flash media due to excessive writes, which will lead to increased endurance of the flash array;
    a first crossbar switch located in the chassis and coupled to each of the mounted blades and at least one network port to allow data communication between each of the mounted blades and the at least one network port, such that the first and second solid-state non-volatile memory blades store read and write file data accessible through the at least one network port, under control of at least one storage protocols—NAS and or SAN, running on a processor on the first CPU blade.

2. The data storage system of claim 1, further comprising a second CPU blade mounted in another of the plurality of blade slots, the second CPU blade having a processor running at least one storage protocols NAS and or SAN, to allow access through the at least one network port to the read and write file data stored on the first and second solid-state non-volatile memory blades;
    support of plurality and different type of modular network adapters, PCI Express, Infiniband, Ethernet, Fiber Channel connected to the non-blocking fabric;
    Each CPU blade can be assigned different storage protocols NAS and or SAN.

3. The data storage system of claim 2, wherein any of the component blade slots can accept a CPU blade or a solid-state non-volatile memory blade.

4. The data storage system of claim 1, the first and second switch fabric blades communicating across the backplane interconnect paths with the first CPU card and with the first and second non-volatile memory blades using a Peripheral Component Interconnect-Express (PCI-E) packets, the first and second crossbar packets using information in the PCI-E packets to switch the PCI-E packets;
    blades on the chassis can have different PCI-E lane widths, to support different adapters;
    PCI-E switch can be replaced with Ethernet, Infiniband or proprietary switch design.

5. The data storage system of claim 4, wherein each of the first and second non-volatile memory blades comprise a PCI-E non-transparent bridge function in the path to the first and second switch fabric blades;
    PCI-E switches, host adapters, and or flash blades can support multi-root input/output virtualization, wherein each CPU blade is assigned its own device address range and configuration register space on each flash blade.

6. The data storage system of claim 1, further comprising a stacking port allowing connection of the data storage system to a plurality of data storage systems coupled to an external interconnect chassis;
    Electrically connected to the plurality of chassis coupled to the external interconnect chassis that is implemented using Ethernet or Infiniband or PCI-E;
    each fabric blade can have a plurality of external stacking ports;
    interconnection of the plurality of the flash data storage system coupled to the external interconnect chassis, allows sharing of flash blade resources between multiple chassis;
    host adapters in a fabric blade or CPU blade can accept an adapter containing a second PCI-E switch allowing high-speed connection at a higher bridge layer between the chassis;
    any CPU blade can write or read file data on a different chassis flash blade coupled to the external interconnect chassis.

7. The data storage system of claim 1, further comprising a temporary power supply that allows each solid-state non-volatile memory blade to complete any pending write tasks prior to shutdown;
    temporary power supply to provide normal operation for some time period in the event of a power failure;
    data storage system providing N+1 redundancy using power supplies.

8. The data storage system of claim 7, each solid-state non-volatile memory blade aggregating write data, when possible, into block writes matching a block size of a solid-state non-volatile memory device mounted on that memory blade.

9. The data storage system of claim 1, each solid-state non-volatile memory blade hosting a plurality of solid-state non-volatile memory device modules and tracking wear statistics for the hosted memory device modules, the tracked wear statistics available to the first CPU blade.

10. The data storage system of claim 9, the first CPU blade having a wear-leveling function to determine the movement of file data between the first and second solid-state non-volatile memory blades according to tracked wear statistics obtained from the memory blades.

11. The data storage system of claim 10, each solid-state non-volatile memory blade having a file move function to effect a transfer of file data to a different memory blade according to a command issued by the first CPU blade.

12. A data storage blade device comprising:
    a blade carder having a plurality of backplane connectors for insertion in a backplane of a blade chassis;
    a plurality of pluggable memory module slots, each capable of receiving a solid-state non-volatile memory module;
    at least one backplane communication interface coupled to connectors in the plurality of backplane connectors, the backplane communication interface allowing the data storage blade device to appear as a local data storage component to a host CPU reachable through the backplane of the blade chassis; a local CPU to receive, over the at least one backplane communication interface, commands from the host CPU to write and read file data respectively to and from memory modules mounted in the pluggable memory module slots, and respond to the commands with data exchanges between at least one of the memory modules and the at least one backplane communication interface; and a wear tracking function to track wear statistics indicative of the number of writes performed to each block of each memory module, the wear statistics available to the host CPU through the backplane communication interface, to do global wear leveling which maximizes the endurance of the non-volatile solid state memory.

13. The data storage blade device of claim 12, further comprising a buffer memory, the local CPU implementing a write cache that, when possible, aggregates write data until sufficient write data is received to fill a block of a memory module.

14. The data storage blade device of claim 13, further comprising a temporary power source sufficient to allow the local CPU to complete writes from the write cache to the non-volatile solid state memory modules upon interruption of an external power supply to the blade device.

15. The data storage blade device of claim 12, wherein the at least one backplane communication interface comprising a PCI-E non-transparent bridge.

* * * * *